US009911366B2

(12) United States Patent
Hilmstedt et al.

(10) Patent No.: US 9,911,366 B2
(45) Date of Patent: Mar. 6, 2018

(54) SHIELD STRIP HAVING A PLURALITY OF PRINTABLE IDENTIFICATION PLATES AND MAGAZINE FOR INSERTING SHIELD STRIPS INTO A PRINTING DEVICE

(71) Applicant: PHOENIX CONTACT GMBH & CO. KG, Blomberg (DE)

(72) Inventors: Markus Hilmstedt, Hessisch Oldendorf (DE); Thomas Poelker, Horn-Bad Meinberg (DE); Uwe Frigge, Bad Salzuflen (DE); Albrecht Schierholz, Schieder-Schwalenberg (DE); Joachim Jacke, Bad Driburg (DE); Fabian Haak, Bielefeld (DE); Sandra Klocke, Vlotho (DE)

(73) Assignee: PHOENIX CONTACT GMBH & CO. KG, Blomberg (DE)

( * ) Notice: Subject to any disclaimer, the term of this patent is extended or adjusted under 35 U.S.C. 154(b) by 35 days.

(21) Appl. No.: 15/039,033

(22) PCT Filed: Nov. 20, 2014

(86) PCT No.: PCT/EP2014/075135
§ 371 (c)(1),
(2) Date: May 25, 2016

(87) PCT Pub. No.: WO2015/082226
PCT Pub. Date: Jun. 11, 2015

(65) Prior Publication Data

US 2017/0011663 A1 Jan. 12, 2017

(30) Foreign Application Priority Data

Dec. 2, 2013 (DE) ........................ 10 2013 113 328

(51) Int. Cl.
*B32B 3/00* (2006.01)
*G09F 3/02* (2006.01)
(Continued)

(52) U.S. Cl.
CPC ................ *G09F 3/02* (2013.01); *B41J 3/407* (2013.01); *B41J 3/4075* (2013.01); *B41J 13/14* (2013.01);
(Continued)

(58) Field of Classification Search
CPC ................. Y10T 428/15; G09F 3/0286; G09F 2003/0201; G09F 2003/0226
(Continued)

(56) References Cited

U.S. PATENT DOCUMENTS

2009/0277062 A1 11/2009 Bier et al.
2010/0011979 A1 1/2010 Bier et al.
(Continued)

FOREIGN PATENT DOCUMENTS

CN 101322168 A 12/2008
CN 201821579 U 5/2011
(Continued)

*Primary Examiner* — Alexander Thomas
(74) *Attorney, Agent, or Firm* — Leydig, Voit & Mayer, Ltd.

(57) ABSTRACT

A shield strip includes an elongated central web, a plurality of printable identification plates for identifying electrical components, the plurality of identification plates being arranged on two sides of the central web in each case in succession along the central web and being connected to the central web via connecting webs, and at least two holding pins of a different shape and/or size being arranged on the central web, wherein the at least two holding pins are formed in each case for engagement in an associated mounting of a magazine of a printing device.

9 Claims, 5 Drawing Sheets

(51) Int. Cl.

| | |
|---|---|
| ***G09F 3/20*** | (2006.01) |
| ***B41J 3/407*** | (2006.01) |
| ***B41J 13/14*** | (2006.01) |

(52) U.S. Cl.
CPC ...... *G09F 3/205* (2013.01); *G09F 2003/0201* (2013.01); *G09F 2003/0226* (2013.01)

(58) Field of Classification Search
USPC ............................................................ 428/43
See application file for complete search history.

(56) References Cited

U.S. PATENT DOCUMENTS

| | | | |
|---|---|---|---|
| 2011/0253871 | A1 | 10/2011 | Bett et al. |
| 2013/0152440 | A1 | 6/2013 | Poelker |

FOREIGN PATENT DOCUMENTS

| | | | |
|---|---|---|---|
| CN | 102233748 | A | 11/2011 |
| DE | 1055640 | B | 4/1959 |
| DE | 3725217 | A1 | 2/1989 |
| DE | 102005058387 | A1 | 6/2007 |
| DE | 102007011179 | A1 | 9/2008 |
| DE | 102010013758 | A1 | 10/2011 |
| EP | 0752693 | A1 | 1/1997 |
| EP | 1058201 | A1 | 12/2000 |
| EP | 1231586 | A1 | 8/2002 |
| EP | 1596351 | A2 | 11/2005 |
| GB | 2309955 | A | 8/1997 |
| WO | WO 02095890 | A2 | 11/2002 |
| WO | WO 2012022469 | A1 | 2/2012 |

SHIELD STRIP HAVING A PLURALITY OF PRINTABLE IDENTIFICATION PLATES AND MAGAZINE FOR INSERTING SHIELD STRIPS INTO A PRINTING DEVICE

CROSS REFERENCE TO RELATED APPLICATIONS

This application is a U.S. National Phase application under 35 U.S.C. § 371 of International Application No. PCT/EP2014/075135, filed on Nov. 20, 2014, and claims benefit to German Patent Application No. DE 10 2013 113 328.2, filed Dec. 2, 2013. The international application was published in German on Jun. 11, 2015, as WO 2015/082226 A2 under PCT Article 21(2).

FIELD

The invention relates to a shield strip and to a magazine for inserting shield strips into a printing device.

BACKGROUND

A shield strip may include an elongate central web and a plurality of printable identification plates. The identification plates are arranged on the two sides of the central web, in each case in succession in a row along the central web, and connected to the central web via connecting webs. The identification plates are for identifying electrical components, such as appliances in switch cabinets, terminals, conductors or cables. For this purpose, an identification characterising the respective component is printed on a printable surface of an identification plate.

A shield strip is known from DE 37 25 217 A1. This document discloses identification carriers in the form of labels, which are connected to a central carrier via separating webs. The labels are arranged on the two sides of the central web, in each case in a row, and a plurality of shield strips are combined to form a unit which can be inserted into a magazine of a printer for printing. One end of the central carrier transitions into a small plate which is connected to a hole for suspending the shield strip, for example on a hook.

WO 2012/022469 A1 discloses shield strips comprising a transverse web and comprising a plurality of labelling plates arranged thereon in succession in a row. In each case, a plurality of shield strips are interconnected via an external frame. The frame comprises guide means for guiding the shield strip in a printer.

The known shield strips comprise the disclosed small plates or frames for handling or guidance in the printer. They are no longer required once the identification plates have been printed and separated, and they lead to increased material consumption for manufacturing an identification plate.

SUMMARY

In an embodiment, the present invention provides a shield strip including an elongated central web; a plurality of printable identification plates for identifying electrical components, the plurality of identification plates being arranged on two sides of the central web in each case in succession along the central web and being connected to the central web via connecting webs; and at least two holding pins of a different shape and/or size being arranged on the central web, wherein the at least two holding pins are formed in each case for engagement in an associated mounting of a magazine of a printing device.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1A:
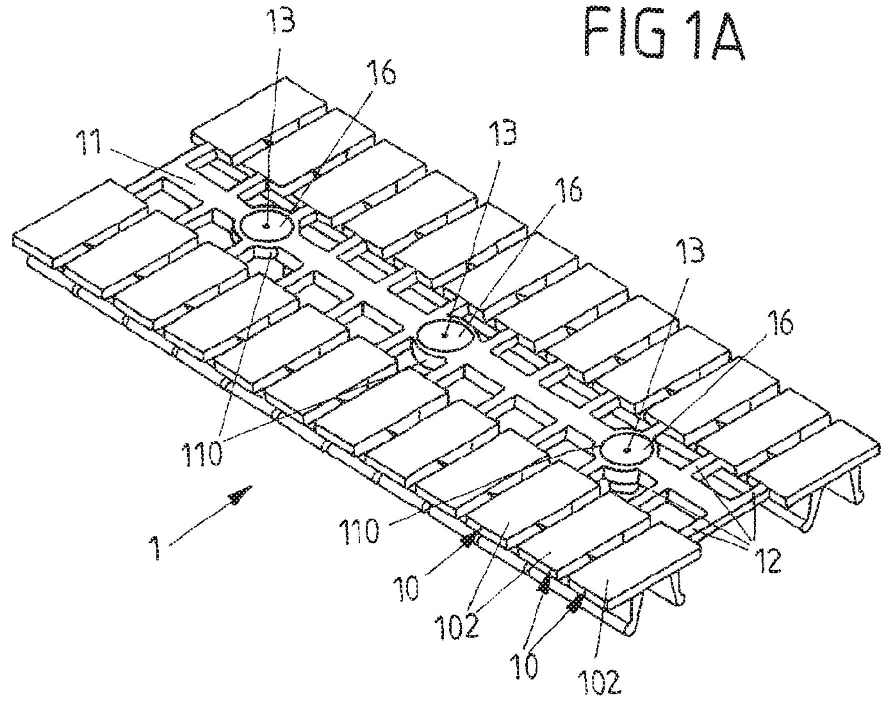
FIG. 1A is a perspective view of the upper face of a first embodiment of a shield strip.

According to an embodiment, the invention provides a shield strip, which consumes relatively less material during its manufacture, for a particular identification plate and which can also be handled easily.

According to an embodiment, a shield strip is provided in which at least two holding pins are arranged on the central web of the shield strip, and differ from one another in shape and/or size. The two holding pins are formed for engagement in each case in an associated and correspondingly shaped mounting of a magazine, by way of which one or more shield strips can be inserted into a printing device.

The holding pins are for positioning and holding the shield strip on the magazine. As a result of the different design of the at least two holding pins, coding of the spatial orientation of the shield strip is additionally caused, since the shield strips can only be inserted into a receptacle of the magazine, which receptacle has a correspondingly formed mounting for each holding pin, in a particular orientation. This can simplify the handling of the shield strip if it has to be positioned in the correct location in the magazine. Positioning in the correct location may be required for example if some identification plates from the shield strip have already been used or if the identification plates are arranged or formed asymmetrically on the two sides of the central web.

A shield strip can be formed with identification plates of various shapes and sizes. It is also possible to provide identification plates of different shapes and/or sizes on a single shield strip. In particular, the individual identification plates may be of a substantially rectangular shape and comprise latch elements, for latch connection to an electrical component, on the lower face thereof.

The connecting webs which connect the identification plates to the central web may extend substantially transversely to the central web. In particular, each identification plate may be connected to the central web via a connecting web which is connected only to the identification plate in question. Alternatively, for example for particularly large identification plates, an identification plate may also be connected to the central web via a plurality of connecting webs. Furthermore, it is also possible for an identification plate to be connected to the central web not via its own connecting web, but to be connected to the central web merely via one or more adjacent identification plates.

The identification plates of the shield strip may in particular be printed in a printing device, such as a plotter, an inkjet printer or a thermal transfer printer. Ink which cures in UV radiation may be used for the printing. Naturally, however, it is also possible to write on the identification plates by hand, for example using a pen, or to use other methods of identification, such as engraving.

The two holding pins of the shield strip may differ in shape and/or size in such a way that they are for example of a different cross section and/or a different length. Alternatively, it may be provided that for example one holding pin is of a triangular cross-sectional shape whilst the other holding pin is of a round or rectangular cross-sectional shape. The holding pins may also be of a conical or circular cylindrical shape and differ in diameter. There may also be three or more holding pins arranged on the shield strip, so long as at least two of them are of a different size and/or shape from one another.

A shield strip can be manufactured by injection moulding. To achieve maximally uniform filling and pressure distribution during the injection moulding, at least two injection points (spaced apart along the central web) are formed on the central web of the shield strip. Depending on the size of the shield strip or the number and size of the individual identification plates, a third injection point or even more may also be formed on the shield strip, in particular also on the central web. Arranging the injection points centrally on the central web between the two rows of identification plates results in a particularly uniform injection moulding process. Additionally, since two rows of identification plates are filled via just one central web and no further filling web is required, the identification plates constitute a particularly high proportion of the material of the shield strip as a whole.

In a development, the injection points may be placed on the central web perpendicularly to the central web or to a plane in which the central web and the identification plates extend. The direction in which an injection point is placed is defined by the direction in which the injection material is injected into the injection mould during the manufacture of the shield strip.

The injection points may further be arranged on the shield strip in such a way that the shortest distance through the material of the shield strip between an arbitrary point in or on the shield strip and the injection point closest to said point does not exceed 40 mm. This distance corresponds approximately to the flow distance of the injection moulding material in the injection mould from the injection point to this arbitrary point. By limiting the flow distance in this manner, a particularly uniform injection moulding process and thus a particularly high surface precision can be achieved. The high surface precision achievable in this manner means that the shield strip is also suitable for printing by thermal transfer printing, as well as for printing for example using an inject printer or plotter.

If the shield strip has two injection points, they may be arranged at a distance from one another which is between 30% and 60%, in particular between 41% and 52%, of the length of the shield strip along the central web. The length of the shield strip may be equal to or different from the length of the central web. In particular, the length of the shield strip along the central web may be longer than the central web by approximately the dimension of an identification plate in this direction. If the shield strip comprises three injection points, they may be arranged at a distance from one another which is between 25% and 35% of the length of the shield strip.

An injection point or a plurality of injection points may further be arranged on the central web opposite a holding pin. The holding pins may extend out from the central web perpendicularly to the central web or to the plane in which the central web and the identification plates extend.

The individual identification plates are connected to a component of the shield strip via at least one predetermined breaking point. A predetermined breaking point of this type provides simple separation of an identification plate from the shield strip, and may for example extend between a respective identification plate and the connecting web via which the identification plate is connected to the central web, and between two adjacent identification plates. In particular, each identification plate may be connected to the rest of the shield strip exclusively via predetermined breaking points.

The shield strip may consist of plastics material, in particular be manufactured in a single piece from an amorphous plastics material. A thermoplastic plastics material, such as polycarbonate or acrylonitrile butadiene styrene, may be used in this context.

In one embodiment of the invention, the identification plates comprise in each case at least one printable surface and are arranged on the shield strip in such a way that all of the printable surfaces of the identification plates of a shield strip are positioned in a common plane. In a development, no other part of the shield strip, such as the central web, the connecting webs or other parts of the identification plates, projects over this plane. In an arrangement of this type, the identification plates of the shield strip may be printed by a print head, for example of a thermal transfer printer, which is positioned on or slides along on the surfaces of the identification plates in a planar manner.

The printable surface is formed in each case on a plate body of an identification plate. A plate body of this type may be formed substantially planar and in particular rectangular and be of a thickness of from 0.65 mm to 1.30 mm perpendicular to the printed surface. In one embodiment of the invention, the length of a shield strip in the longitudinal direction of the central web is between 5.6 cm and 7.0 cm.

To print a shield strip, it may be inserted into a magazine as disclosed herein for inserting shield strips into a printing device. A magazine of this type comprises a plurality of receptacles which are formed so as to receive in each case a shield strip comprising a plurality of identification plates. At least two mountings, which differ from one another in shape and/or size, are arranged in each case on the receptacles. These mountings are designed to engage in each case by means of an associated holding pin, formed corresponding to the mounting, of a shield strip. Thus, only one of the two holding pins of the shield strip can engage in at least one of the two mountings (coding). In this context, it is provided that the shield strip can only be received properly in the receptacle of the magazine if all of the holding pins engage in the associated mountings. Therefore, the shield strip can be inserted into the receptacle only in a particular spatial orientation.

In a development, at least one, in particular two recessed grips are provided in each case on some or all of the receptacles of the magazine and make it possible to grip a shield strip arranged in (inserted into) a receptacle of this type in a simplified manner.

The receptacles of the magazine may comprise in each case at least one support web, against which a shield strip arranged properly in the receptacle is braced, in particular during a printing process in a printing device such as a thermal transfer printer. An identification plate can thus be prevented from bending excessively during printing, as this would worsen the printing result.

FIG. 1A to 4 are various views of a first embodiment of a shield strip 1. As can be seen for example in FIG. 1A, the shield strip 1 comprises a plurality of identification plates 10, which are arranged in succession in a row in each case on two opposite sides of a central web 11, symmetrically about said web. Each identification plate is connected to the central web 11 via a connecting web 12.

The central web 11 is elongate and in the embodiment is of a substantially rectangular cross section (as are the connecting webs 12). An injection point 13, placed centrally in a circular, recess-like depression in the form of a cup 16, is provided in each case on three portions 110 separated from one another in the extension direction of the central web 11. The volumes in an injection mould for manufacturing the shield strip 1, where the portions 110 having the cups 16 formed therein are formed, provide uniform distribution of the injection moulding material in the injection mould during the manufacture of the shield strip 1. The injection moulding material, which forms the shield strip 1 after curing, flows from the injection points 13 via the central web 11 and the connecting webs 12 leading away from the central web 11 into the parts of the injection mould provided for forming the individual identification plates 10. Adjacent identification plates 10 are interconnected separably (so as to be able to be broken off, as described below), and therefore the injection moulding material can also flow from an identification plate 10 into an adjacent identification plate 10 during the injection moulding.

Each of the identification plates 10 comprises a printable surface 102. All of the identification plates 10 of the shield strip 1 are arranged in such a way that the printable surfaces 102 thereof are positioned in one plane. As a result, the identification plates 10 can be printed particularly efficiently by means of a print head, for example of an inkjet printer, which can be moved along the surface, or by means of a thermal transfer print head.

Figure 1B:
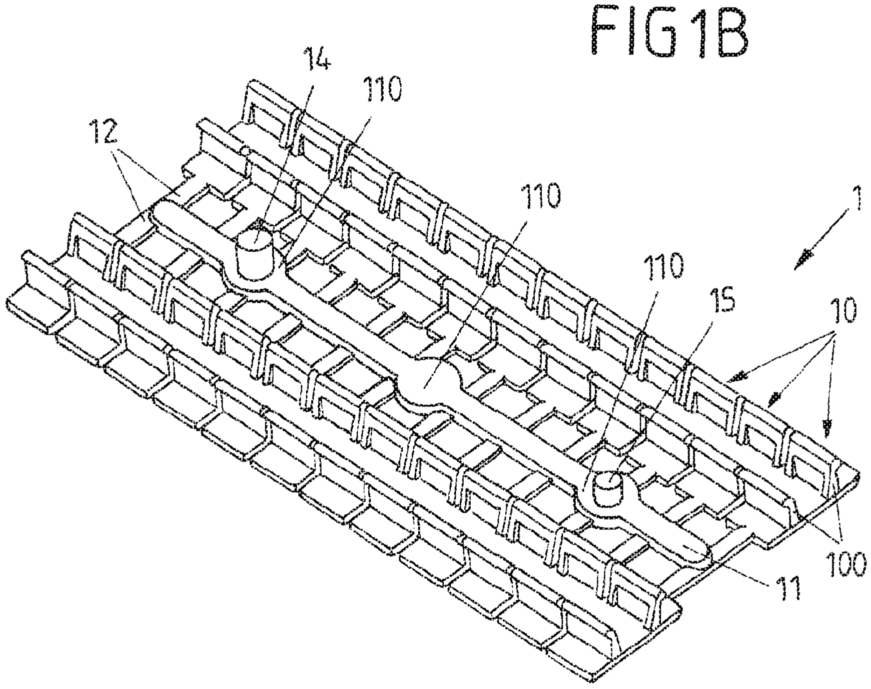
FIG. 1B is a perspective view of the lower face of the shield strip of FIG. 1A.

The face of the shield strip 1 on which the printable surfaces 102 of the identification plates 10 extend is referred to herein as the upper face of the shield strip 1. The lower face of the shield strip 1, opposite this upper face, is shown in FIG. 1B.

In this drawing, it can be seen that each identification plate 10 comprises two latch arms 100, which are provided for latching to corresponding latch elements on an electrical component so as to identify said electrical component using the identification plate 10. In addition, two holding pins 14, 15 integrally formed on the central web 11 can be seen, and are arranged in each case opposite an injection point on the central web 11. The two holding pins are of a substantially circular cylindrical shape, one of the holding pins 14 being longer than the other holding pin 15 and also having a larger diameter. On a receptacle of magazine, a correspondingly formed mounting, in which the respectively corresponding holding pin 14, 15 can engage, may be associated with each of the holding pins 14, 15. As a result, the shield strip 1 can be inserted into the receptacle only in a particular spatial orientation. The differently designed holding pins 14, 15 thus cause spatial coding of the shield strip 1.

Figure 2A:
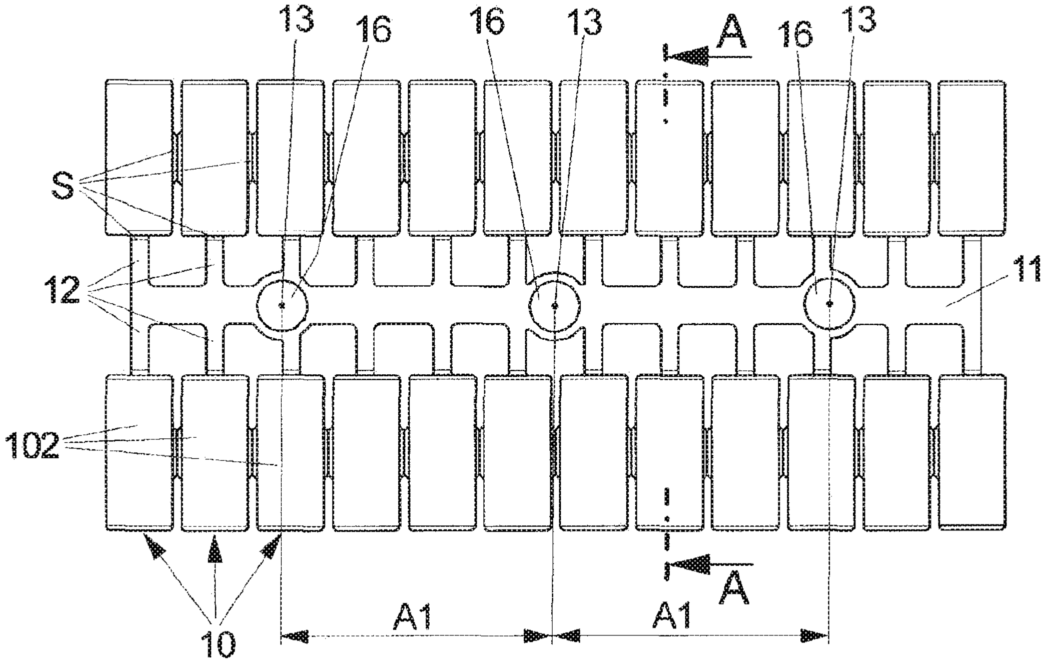
FIG. 2A is a plan view of the upper face of the shield strip of FIGS. 1A and 1B.

In the plan view of the upper face of the shield strip 1 from FIG. 2A, it can be seen that the individual adjacent identification plates 10 are interconnected in each case via a predetermined breaking point S and connected to one of the connecting webs 12 in each case via a predetermined breaking point S. Thus, each identification plate 10 is connected to the rest of the shield strip 1 via at least two predetermined breaking points S. Predetermined breaking points of this type may be formed by deliberate (for example groove-shaped) weakenings in the material, in particular by narrowing the injection mould at said connecting points and by a resulting reduced material thickness.

Adjacent injection points 13 are placed in each case at a distance A1 on the central web 11. In the exemplary embodiment of the shield strip 1, the distance A1 is specifically 1.75 cm. The total length of the shield strip 1 is 5.7 cm; the ratio of the distance A1 between adjacent injection points 13 to the length of the shield strip 1 is thus approximately 30.7%.

Figure 2B:
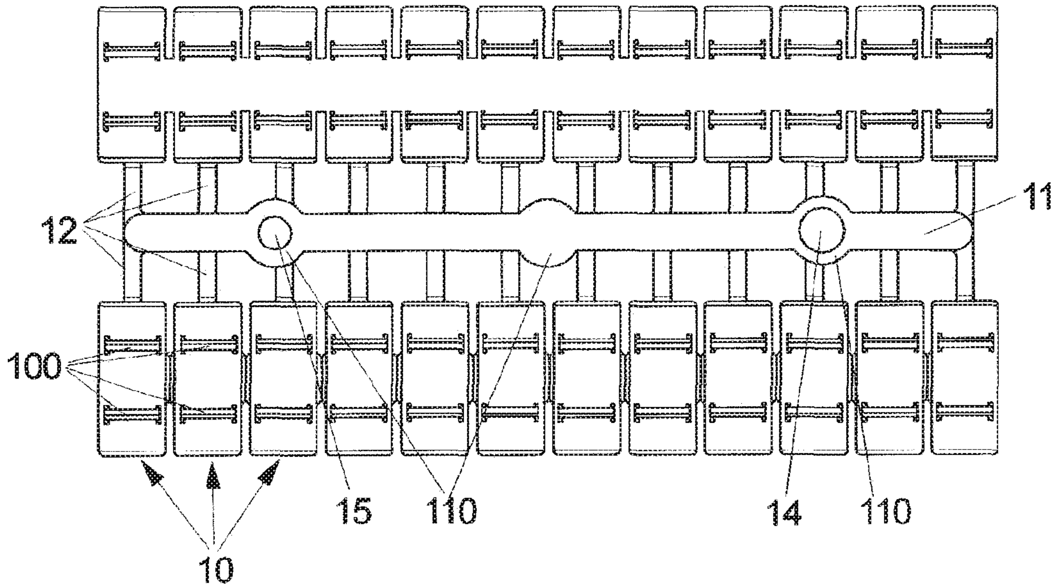
FIG. 2B is a plan view of the lower face of the shield strip of FIGS. 1A to 2A.

In the plan view of the lower face of the shield strip 1 according to FIG. 2B, it can be seen that in the present case holding pins 14, 15 are provided only opposite the two injection points 13 on the central web 11. Naturally, one or more further holding pins could also be formed on the shield strip, for example on the central portion 110.

Figure 3A:
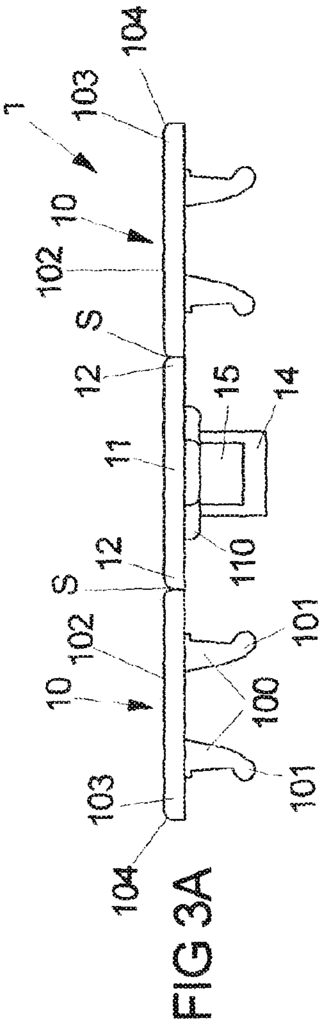
FIG. 3A is a side view of the shield strip of FIG. 2A.
Figure 3B:
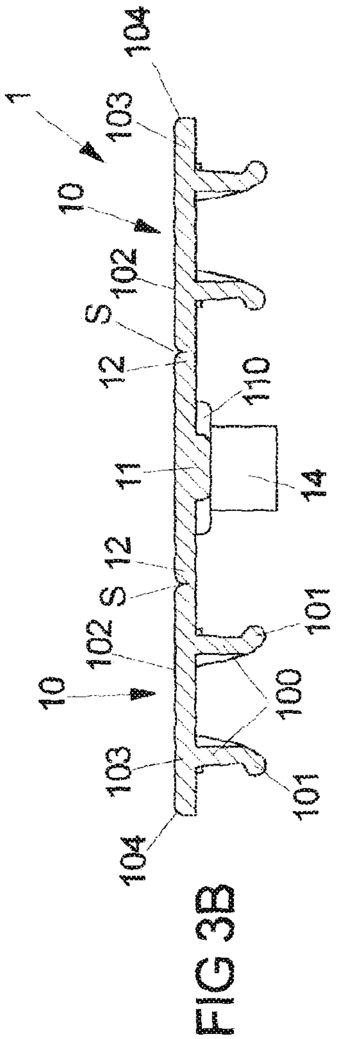
FIG. 3B is a cross section through the shield strip along the section plane A-A of FIG. 2B.

In the side view of the shield strip 1 in the longitudinal direction of the central web 11 according to FIG. 3A and in the sectional view of FIG. 3B, in addition to the formation of the predetermined breaking points S (as groove-shaped weakenings) the shape of the latch arms 100 of the identification plates 10 can be seen between the identification plates 10 and the connecting webs 12. Said arms extend substantially perpendicularly from a plate body 103 which forms the printable surface 102, on the side thereof opposite the printable surface 102. The latch arms 100 have in each case a widened end 101, which can engage resiliently with an associated latch element of a component to be identified.

On the side edges of the identification plates 10, bevels 104 are provided in each case, and are intended to prevent a print head sliding over the identification plate from striking the side edges thereof. Optionally, a web-shaped reinforcement may be integrally formed on the lower face of the identification plates 10, so as to prevent the identification plates 10 from bending too much during printing, for example if a thermal transfer print head exerts a pressure on the identification plates 10.

It can be seen from FIG. 3B that the central web 11 is not only wider than the connecting webs 12, but also of a greater thickness (perpendicular to the plane in which the printable surfaces 102 of the identification plates 10 are positioned). As a result, it is achieved that the injection moulding material can be introduced into the injection mould uniformly during the injection moulding process. Furthermore, as a result of the reinforcement of the central web 11 and the connection of the individual adjacent identification plates 10 via predetermined breaking points S, increased stability of the shield strip 1 is achieved. As a result, shield strips 1 can be transported as bulk material, making it possible to simplify the storage and transportation of the shield strips 1.

Figure 4:
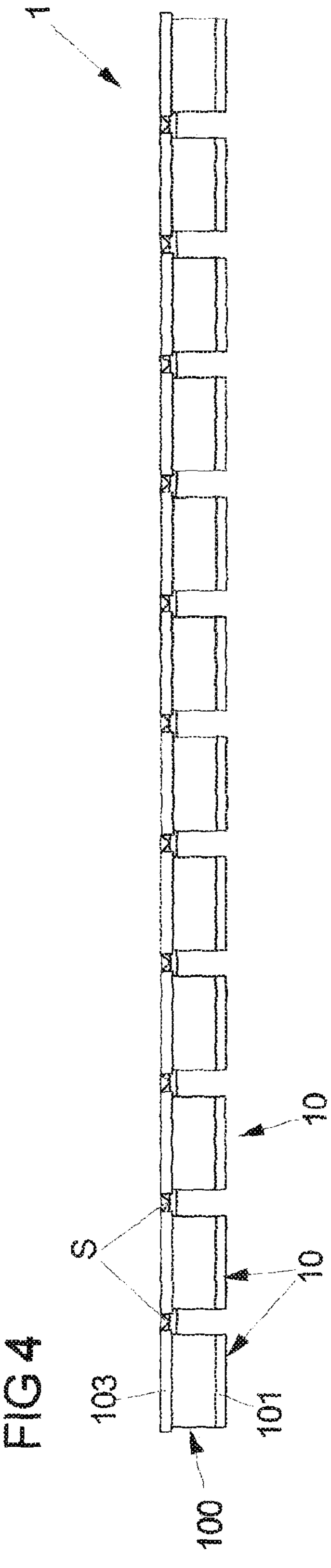
FIG. 4 is a side view of the longitudinal face of the shield strip of FIG. 1A to 3B.

FIG. 4 is a side view of the longitudinal face of the shield strip 1 together with the identification plates 10 connected to the plate bodies 103 thereof via predetermined breaking points S. It can also be seen that the latch arms 100 extend over almost the entire width of the plate bodies 103.

Figure 5:
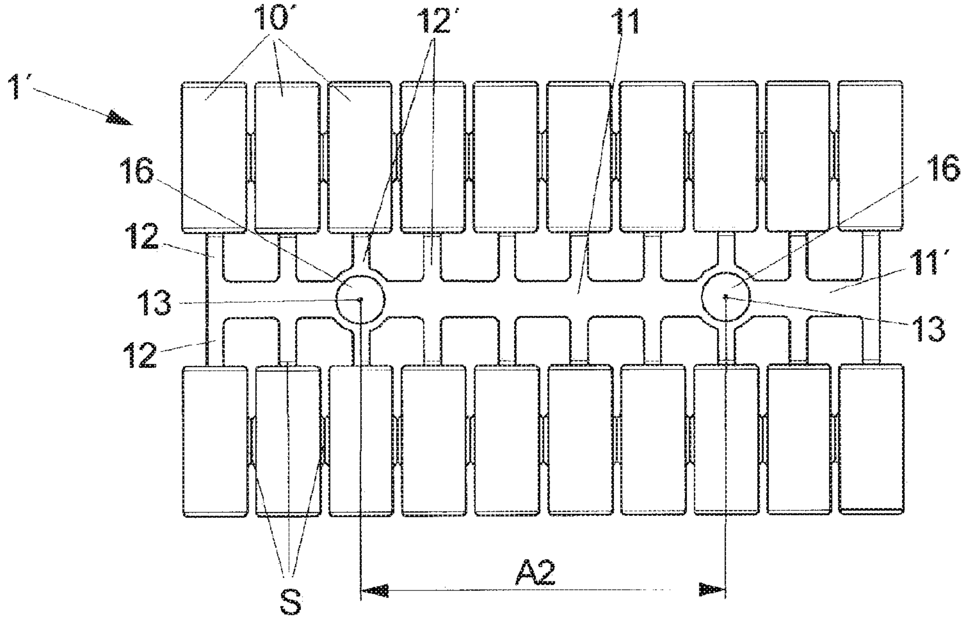
FIG. 5 is a plan view of the upper face of a second embodiment of a shield strip.

FIG. 5 shows a second embodiment of a shield strip 1'. This corresponds in construction substantially to the shield strip 1 of the first embodiment. Components having like function and at least comparable construction are provided with like reference numerals. Unlike in the first embodiment, the shield strip 1' according to FIG. 5 comprises only ten identification plates 10' rather than twelve identification plates 10. However, they are of larger dimensions. Therefore, even at a length of 5.6 cm, the shield strip 1' according to the second embodiment is only slightly shorter than the above-described shield strip 1.

A further fundamental difference consists in that the shield strip 1' according to FIG. 5 comprises merely two injection points 13 (at a distance A2 of 2.9 cm) on the central web 11'. Two injection points 13 can be sufficient to achieve a uniform injection moulding process, so long as the maximum flow distance of the injection moulding material 5 does not substantially exceed 5 cm, preferably 4 cm. As a result of a uniform injection moulding process, a surface precision of the printable surface 102 can be achieved, which makes printing using a plotter, inkjet printer and thermal transfer printer possible. Opposite the injection points, two holding pins 14, 15 of different sizes and/or shapes are arranged on the central web 11' (not visible in FIG. 5).

Figure 6:
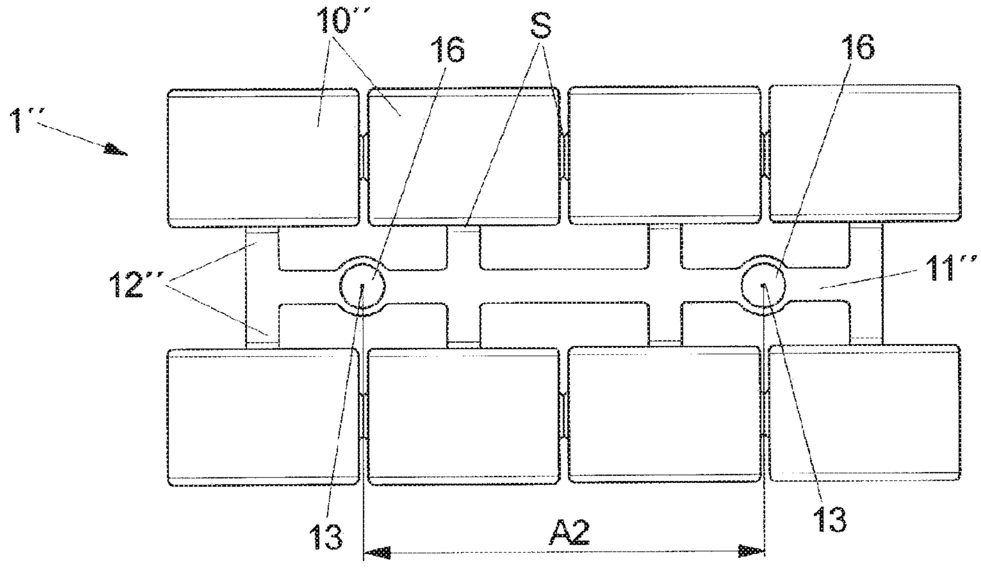
FIG. 6 is a plan view of the upper face of a third embodiment of a shield strip.

A third embodiment of a shield strip 1" is shown in FIG. 6. This comprises in each case four identification plates 10" in two rows on the two sides of the central web 11", said plates being of much larger dimensions than the identification plates 1, 1' of the first two embodiments. So as to ensure a rapid and uniform injection moulding process and to connect the identification plates 10" stably to the central web 11", the connecting webs 12" are designed so as to be wider than in the above-described embodiments of the shield strips 1, 1'. According to FIG. 6, the shield strip 1" comprises two injection points 13 at a distance A2 of for example 2.9 cm. The entire shield strip is of a length of 5.8 cm.

Figure 7:
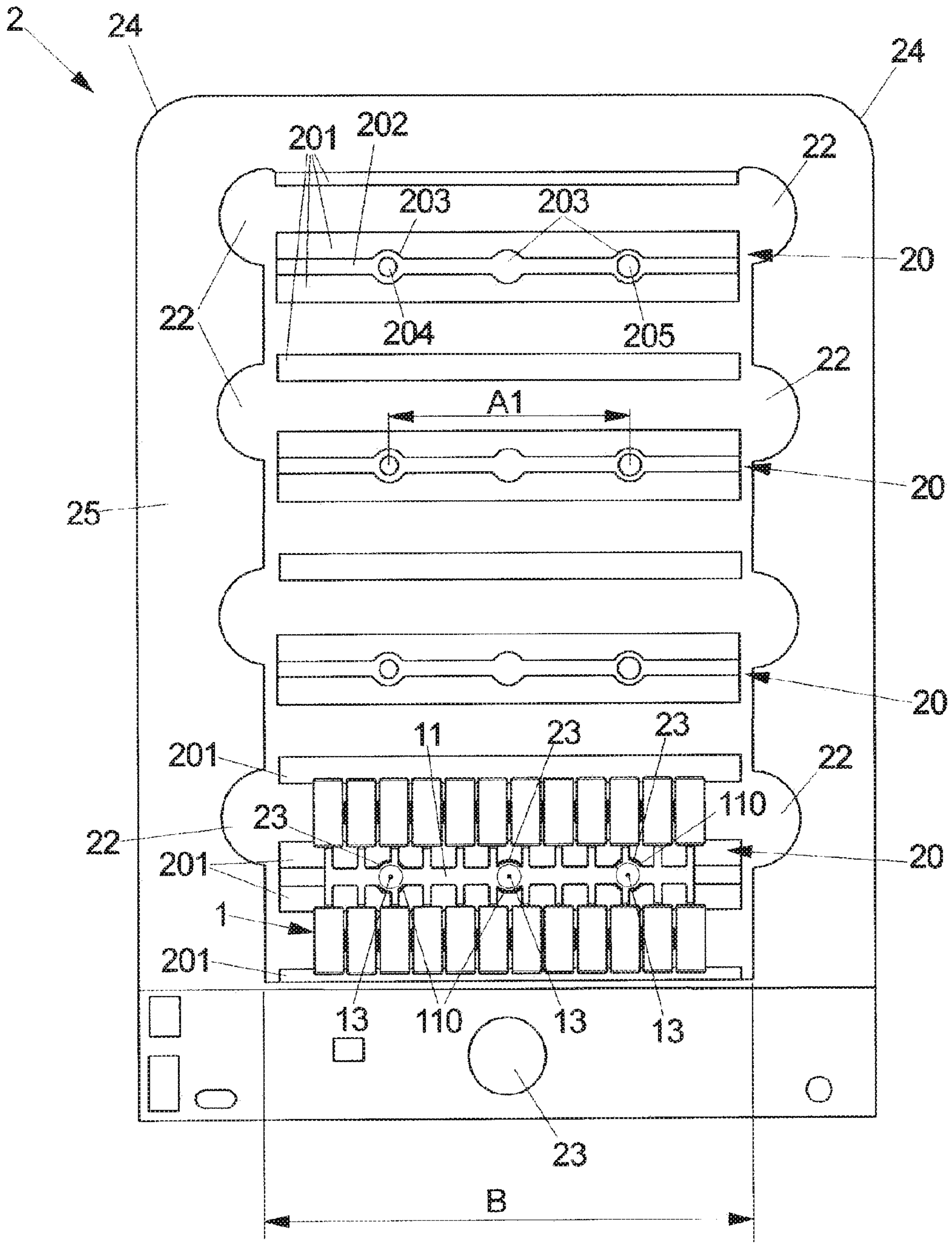
FIG. 7 is a plan view of a magazine according to an embodiment of the invention for inserting shield strips into a printing device comprising a plurality of receptacles and a shield strip arranged in one of the receptacles.

FIG. 7 shows a magazine 2 for receiving one or more shield strips 1 and for introducing into a printing device, such as an inkjet printer, a plotter or a thermal transfer printer. The magazine 2 comprises four receptacles 20, for receiving a shield strip 1 in each case, a shield strip 1 being inserted into a receptacle 20 by way of example. The receptacles 20 are jointly enclosed by an externally encircling elevated frame 25. To make it easier to grip the shield strip 1 arranged in the lower receptacle 20 (or in general a shield strip 1 arranged in a receptacle 20), a recessed grip 22 is formed in each case in the frame 25 on the two sides next to each receptacle.

Furthermore, two mountings 204, 205 in the form of blind holes are provided on each receptacle 20, and are designed for engagement of the holding pins 14, 15 of a shield strip 1. Each receptacle further comprises a plurality of, in the present case four, supports 201 against which the plate bodies 103 of the identification plates 10 of a shield strip 1 arranged in the receptacle can be braced. For receiving the central web 11 comprising injection points 13 of a shield strip 1, clearances 202, 203 are accordingly formed on the receptacles 20.

As a result of the design of the receptacles 20 comprising the mountings 204, 205, shield strips 1 can be inserted into the receptacles 20 only in one spatial orientation. For this purpose, the mountings 204, 205 are designed differently, and in the present case are of a different internal diameter and a different depth. As a result, the holding pin 14 of larger diameter can engage only in the mounting 205 of correspondingly formed internal diameter, and not, however, in the other mounting 204, the internal diameter of which is formed to correspond to the smaller diameter of the other holding pin 15. The holding pins 14, 15 and the mountings 204, 205 may be formed in shape and/or size in such a way that the two holding pints 14, 15 can engage in each case only in the one associated mounting 204, 205.

This may be expedient for example if some identification plates 10 of a shield strip 1 have already been used, in other words printed and separated (broken off) from the shield strip 1. So that the remaining shield strips can still be used, the printing device records which of the identification plates 10 have already been printed in a previous printing process. The coding of the spatial orientation of the shield strip 1 prevents it from being supplied to the printing device in a different orientation from before, in which case the printing device would eject ink at empty spaces. Since in practice it may often happen that a user prints only a few identification plates 10 in one work step, each shield strip 1 can thus be used more efficiently.

Shield strips 1 of a length of at most the width B of the receptacles 20, which may for example be 7.0 cm, can be inserted into the receptacles 20. Shield strips 1 may generally be formed with identification plates 10 of different sizes and with a different number of identification plates 10.

In the arrangement, a plurality of different shield strips 1 having different sizes (or different shapes) and a different number of identification plates 10 may be provided, the distance A1 between the two (external) injection points 13 being the same in each case for the various shield strips 1. This distance A1 is also equal to the distance between the two mountings 204, 205 on the receptacles 20 of the magazine 2, meaning that the same magazine 2 can be used for many different shield strips 1.

For simplified introduction into a printing device, the frame 25 of the magazine 2 comprises two rounded corners 24 and a hole 23 at which the magazine 2 can for example be pulled out of or fixed in a printing device.

The concept underlying the present invention is not limited to the above-described embodiments, but can also be implemented in differently designed embodiments. For example, a magazine 2 may also have fewer than or many more than four receptacles 20. These also do not have to be arranged in a row, as shown in FIG. 7, but for example may also be arranged side by side in a plurality of rows. Furthermore, the length and cross section of the connecting webs may also be changed from the shown embodiments of the shield strips 1, 1', 1", for example being formed longer or shorter.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE NUMERALS

1, 1', 1" Shield strip
10, 10', 10" Plate
100 Latch arm
101 Widened end
102 Printable surface
103 Plate body
104 Bevel
11, 11', 11" Central web
110 Portion
12, 12', 12" Connecting web
13 Injection point
14 Holding pin
15 Holding pin
16 Cup
2 Magazine
20 Receptacle
201 Support web
202 Clearance
203 Clearance
204 Mounting
205 Mounting
22 Recessed grip
23 Hole
24 Rounded corner
25 Frame
A1-A2 Distance
B Width
S Predetermined breaking point

The invention claimed is:

1. A shield strip comprising:

an elongated central web;

a plurality of printable identification plates for identifying electrical components, the plurality of identification plates being arranged on two sides of the central web in each case in succession along the central web and being connected to the central web via connecting webs; and at least two holding pins of a different shape and/or size being arranged on the central web, wherein the at least two holding pins are formed in each case for engagement in an associated mounting of a magazine of a printing device.

2. The shield strip according to claim 1, wherein the holding pins are formed differently in such a way that the shield strip can be inserted into a receptacle of a magazine, which receptacle has a correspondingly formed mounting for each holding pin only in one spatial orientation.

3. The shield strip according to claim 1, wherein the holding pins are of a different cross section and/or a different length.

4. The shield strip according to claim 1, wherein at least one injection point is arranged on the central web opposite one of the holding pins.

5. The shield strip according to claim 1, wherein the individual identification plates are connected to a component of the shield strip via at least one predetermined breaking point.

6. The shield strip according to claim 1, wherein the shield strip is a single piece of an amorphous plastics material.

7. The shield strip according to claim 1, wherein the identification plates comprise, in each case, a printable surface, and wherein the printable surfaces of all of the identification plates of the shield strip are positioned in a common plane over which no other part of the shield strip projects.

8. The shield strip according to claim 1, wherein the identification plates comprise in each case a plate body which forms a printable surface and which is of a thickness of from 0.65 mm to 1.30 mm.

9. The shield strip according to claim 1, wherein a length of the shield strip along the central web is from 5.0 cm to 7.5 cm.

* * * * *